(No Model.)

W. M. WALLACE.
MODE OF MAKING GLASS SCREW CAPS.

No. 264,379. Patented Sept. 12, 1882.

Witnesses.
Jonathan Ord.
W. A. Hope

Inventor.
William M. Wallace,
Josiah W. Ells
Attorney.

N. PETERS, Photo-Lithographer, Washington, D. C.

UNITED STATES PATENT OFFICE.

WILLIAM M. WALLACE, OF PITTSBURG, PENNSYLVANIA, ASSIGNOR OF ONE-HALF TO CHARLES M. RHODES, OF BRIDGEPORT, OHIO.

MODE OF MAKING GLASS SCREW-CAPS.

SPECIFICATION forming part of Letters Patent No. 264,379, dated September 12, 1882.

Application filed March 18, 1882. (No model.)

*To all whom it may concern:*

Be it known that I, WILLIAM M. WALLACE, a citizen of the United States, residing at Pittsburg, in the county of Allegheny and State of Pennsylvania, have invented a new and useful mode and means of manufacturing pressed-glass screw-caps for use on jars, bottles, and other articles of a similar character to which they may be applied.

The nature of my invention consists in the production of a hollow glass cap having a ribbed outside and a screw formed around the inside by pressing the same to shape in a properly-constructed mold.

My invention will be readily understood from the following description, taken in connection with the accompanying drawings, wherein—

Figure 1:
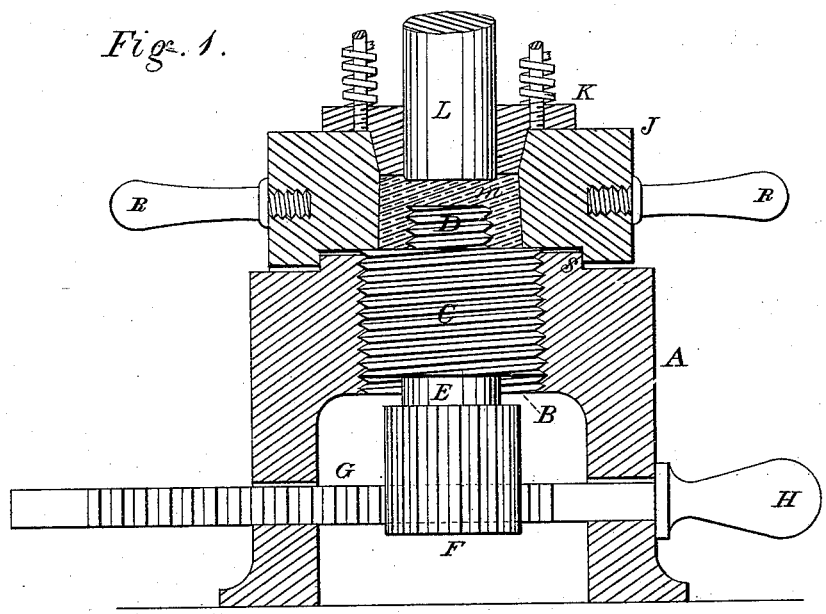
Figure 2:
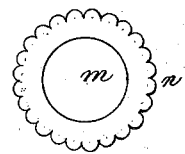
Figure 3:
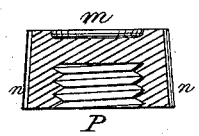
Figure 4:
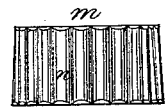

Figure 1 represents a transverse vertical and central section of such a mold as I use in the production or manufacture of glass screw-caps; Fig. 2, a top view of a glass cap; Fig. 3, a transverse section taken through the middle of the cap; Fig. 4, an outside edge view, showing the flutes and ribs thereon.

For the rapid and perfect making of such glass screw-caps as is contemplated in my invention I construct a mold by forming a heavy circular iron base, A, vertically and centrally through which is cut a coarse female screw, B, into which is introduced a male screw, C, of corresponding diameter, but somewhat less in depth. On top of this large screw C, and integral therewith, is a smaller one, D, of the same inclination and pitch with reference to the matter of thread, and of such size and diameter as is required for the inside of the glass cap.

In the hollow of the base A, beneath the large screw C, and connected therewith by a strong neck, E, is a cog-wheel, F, the teeth of which extend up and down, engaging with those of a transversely-sliding rack, G, that extends through and has its bearings in the walls of the base. This rack is provided with a handle, H, on one end, by which it may be drawn back and forth, so as to produce a rotary motion in the cog-wheel and thereby impart a like movement to the large and small screws. On drawing the rack outwardly by means of its handle both screws are caused to rotate and move downward until the end of the smallest, D, is on a level with the top of the stand A, and by a reverse movement of the toothed rack the screws are made to ascend till that point is reached where the upper portion of the largest screw is slightly above the elevated rim S, extending around the top of the base. When the screws are in the position shown in Fig. 1, and the plunger L, with its spring plate or follower, K, raised by the action of a press, a circular open mold, J, of suitable size, somewhat smaller in diameter than the screw C, and fluted or vertically ribbed around its inside, and recessed to fit the elevated rim S, so as to bring it directly and concentrically over the small screw D, is placed, by means of its handles R, with its inner lower edge resting upon the upper portion of the large screw, so as to make between them a tight joint. Now, if a sufficiency of molten glass be placed in the mold and the plunger L and its follower K brought down, the glass will be forced around the small screw, and at the same time take the exact impress of the mold. The rack may then be drawn out, thereby rotating the screws to the extent of withdrawing the small one, D, from the glass, the ribbed exterior sides of which prevent it from turning in the mold during that operation. Immediately upon the withdrawal of the screw the plunger should be raised and the mold removed, that the glass may drop out. The screw should be then reinstated and the mold returned to its place, that the operation may be repeated and other caps made in the same manner. The glass cap *m*, after leaving the mold, will be found to have a screw, P, around its interior corresponding to that in the mold, and a slight saucer-shaped depression on top produced by the inner end of the plunger, while the exterior sides of each cap have all around a series of vertical flutes and ribs, *n*, that enable a firm hold to be taken on the cap during the time it is being screwed on or off a bottle or jar.

I am aware that glass-molding machines have been constructed in which a forming-screw and a withdrawing-screw of the same pitch, both operated by the same pinion and sliding rack, have been used in connection with a movable mold; I therefore do not claim such construction, broadly.

What I claim, and desire to secure by Letters Patent, is—

1. For making glass screw-caps, a mold provided with a central movable screw for forming the inside of the glass cap, in combination with a withdrawing-screw greater in diameter than the largest interior portion of and forming the base of the mold, thereby avoiding seams or joints in the immediate vicinity of the forming-screw, as shown and described.

2. A mold provided with a central forming-screw, in combination with the vertically-ribbed or fluted interior walls of said mold, whereby the glass cap is prevented from turning during the withdrawal of said forming-screw, as shown and described.

W. M. WALLACE.

Witnesses:
JOSIAH W. ELLS,
JONATHAN ORD.